Sept. 20, 1932.  J. H. HERTNER  1,878,139
VEHICLE
Original Filed April 26, 1920

INVENTOR
John H. Hertner
By Geo. A. Pitts
ATTORNEY

Patented Sept. 20, 1932

1,878,139

UNITED STATES PATENT OFFICE

JOHN H. HERTNER, OF LAKEWOOD, OHIO, ASSIGNOR TO THE BAKER-RAULANG COMPANY, OF CLEVELAND, OHIO, A CORPORATION OF OHIO

VEHICLE

Original application filed April 26, 1920, Serial No. 376,504. Divided and this application filed May 29, 1926. Serial No. 112,502.

This application is a division of my application filed April 26, 1920, Serial No. 376,504.

This invention relates to wheels for vehicles and particularly to wheels intended to be used in connection with trucks that are constructed to support and carry very heavy loads. The invention consists in the particular construction of vehicle wheels as will be hereinafter pointed out whereby the wheel is of simple construction, and at the same time of great strength, as is required for the uses to which it is to be put.

For the purpose of illustration I have, in the accompanying drawing shown and hereinafter described one form of device embodying my invention.

Figure 1:
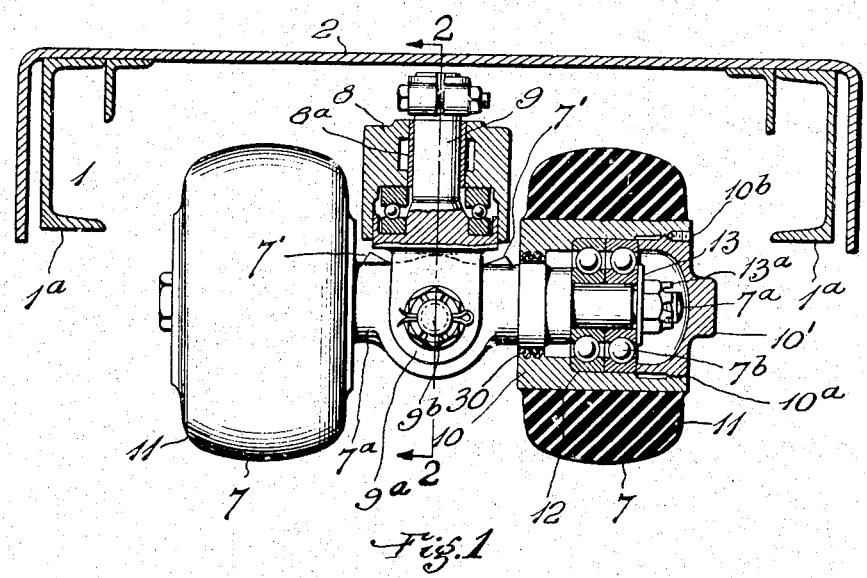
Figure 1 is a transverse elevation of a truck provided with wheels which embody the present invention.
Figure 2:
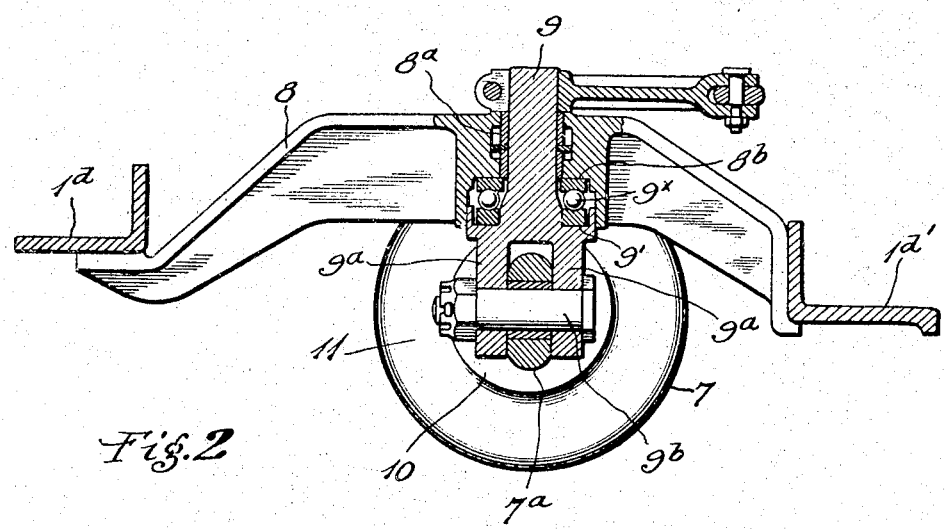
Figure 2 is a longitudinal sectional view taken on the line 2—2 of Figure 1.

Referring to the drawing, 1 indicates as an entirety a frame or chassis, which, for illustrative purposes, is shown as provided with an elevating platform 2. My invention is particularly adapted for this type of truck because of the desirability of making the load-carrying portion of the frame or chassis, or that part which supports the platform 2, relatively low; and the necessity of making the wheels that support the load-carrying platform of relatively small diameter and of very great strength.

7 indicates a pair of relatively small supporting wheels, which in the illustrated form of truck construction, are mounted below the platform supporting portion of the truck frame 1. Preferably each of the wheels 7 comprises a tubular member 10, extending from side to side of the wheel and serving both as a rim for a tire 11 and as a hub. As shown in Fig. 1 this member 10 is tubular, that is, it extends for a considerable distance longitudinally of the axle with which it has a bearing contact at one end while the other end is closed over the end of the axle. The side walls of the member are relatively thin, thus minimizing the diameter of the member. The outer surface of the member receives the tire directly while the inner surface holds the anti-friction means. At 12, the inner wall of the annular member is cut away to form a shoulder and seat for the outer raceway of one or more anti-friction bearings 7b, the construction being such that the bearings, when positioned against the shoulder, are arranged centrally of the wheel or its tread. 7a indicates an axle for the wheels 7, it extending into but preferably not entirely through the hub members 10 thereof. The axle 7a, at a point near each free end, is reduced in diameter to form a shoulder against which the inner race of the adjacent anti-friction bearing 7b is seated. 13 indicates a washer and 13a a nut fitting the free end of the axle 7a and engaging the bearing race, preferably the inner race, and axle 7a, respectively, to hold the former in position. The outer end of the hub member 10 may be provided with screw-threads, as shown at 10a, adapted to serve as a suitable means for securing an adjustable cap 10' in position against the outer race of the bearings 7b. The cap 10' is preferably fixed in position by suitable locking means 10b.

The tubular member 10 is relatively long and of small diameter, and the tire 11 applied thereto approximates in width the length of the member 10 and is preferably formed of solid elastic material, such as vulcanized rubber. The result is that the wheel member 10 is of great strength and rigidity, so that the antifriction bearings interposed between it and the axle may be much shorter than is the wheel hub part 10, as clearly represented in Fig. 1, the bearings being located midway between the ends of the hub and the rim or tire member 10. This arrangement of parts results in the formation of a truck wheel, particularly adapted for uses for which it has been specially designed. The width of tire provided gives the necessary traction and bearing upon the surface over which the truck passes; the strength and construction of the tubular member supporting the tire and serving also as a hub gives the necessary strength to bear the loads which the wheel may be expected to carry, and at the same time permits the use of antifriction bearings between the wheel and axle of much less length than the length of the tubular member 10; for, as will be apparent, a bearing coincident in length with that of the hub member 10 is unnecessary and indeed would be undesirable.

It will be seen that the tubular or annular hub and tire member 10 extends in either direction considerably beyond the anti-friction bearings for the wheel, forming chambers surrounding the axle. These chambers are closed, the outer one by the cap 10' and the inner one by dust guard 30. In the outer of the said chambers are located the means, 13 and 13ª, for securing the inner race-ways in position upon the axle.

8 indicates a truss member arranged midway between and parallel to the frame members 1a. The front and rear ends of the truss member 8 are supported on the cross members 1d and 1d', being connected thereto in any well known manner. An opening is provided in the truss member 8 to receive and support a king bolt 9 connected at its lower free end to the axle 7a. At 8b the truss member is formed with an annular recess and at 9' the bolt is provided with a collar permitting the provision of an anti-friction load bearing 9x. The lower free end of the king bolt 9 is preferably bifurcated, as shown at 9a, and straddles the axle 7a. 9b indicates a pin or bolt which extends through openings formed in the bifurcations 9a and axle 7a and pivotally connects the king bolt 9 and axle 7a together, this form of construction permitting the wheels 7 to rock about the lower end of the king bolt 9 and accommodate this to the unevenness of the floor at all times. 7' indicates suitable stops carried by the axle 7a and arranged to be engaged by some suitable part of the king bolt to prevent undue inclination of the frame 1 and platform 2.

By making the wheels 7 of the type indicated, a construction is provided which is at once economical, and yet powerful enough to sustain the heavy loads imposed. It is also evident that the wheels may be turned with little effort. The combined hub and rim member 10 is easily assembled and affords the desired clearance in the limited space allowed. Furthermore, it provides for a tire of ample proportions, as indicated.

A construction of this character is of material advantage in trucks of this class and in similar devices, as will readily be understood by those skilled in the art to which this invention relates and to such persons many alterations in construction and widely differing embodiments and applications of my invention will suggest themselves without departing from the spirit thereof and the scope of the claims. My disclosures and the description herein are purely illustrative and are not intended to be in any sense limiting.

What I claim is:

In an industrial truck construction, the combination with an axle, a tubular member into which said axle extends and forming a combined wheel hub and tire seat, sets of radial and thrust load anti-friction ball bearings disposed side by side centrally of said member to provide equal over-hanging portions of said tubular member on each side of the bearings and arranged to resist thrust movements transmitted through said member and axle, each said set of bearings having inner and outer races and the inner sides of the races for the innermost set engaging seats provided on said axle and internal wall of said member, respectively, removable means engaging the outer end portion of said axle and outer side of the inner race for the outermost set, and removable means engaging the inner wall of said member adjacent its outer end and the outer side of the outer race for the outermost set.

In testimony whereof, I have hereunto affixed my signature.

JOHN H. HERTNER.